United States Patent
Töpfl et al.

(10) Patent No.: US 11,503,844 B2
(45) Date of Patent: Nov. 22, 2022

(54) METHOD AND DEVICE FOR CONTINUOUS PROCESSING WITH A PULSED ELECTRIC FIELD

(71) Applicant: DEUTSCHES INSTITUT FÜR LEBENSMITTELTECHNIK E.V, Quakenbrück (DE)

(72) Inventors: Stefan Töpfl, Quakenbrück (DE); Volker Heinz, Quakenbrück (DE); Johann Isaak, Quakenbrück (DE); Martin Stute, Quakenbrück (DE)

(73) Assignee: DEUTSCHES INSTITUT FÜR LEBENSMITTELTECHNIK E.V

( * ) Notice: Subject to any disclaimer, the term of this patent is extended or adjusted under 35 U.S.C. 154(b) by 783 days.

(21) Appl. No.: 16/480,897

(22) PCT Filed: Jan. 29, 2018

(86) PCT No.: PCT/EP2018/052170
§ 371 (c)(1),
(2) Date: Jul. 25, 2019

(87) PCT Pub. No.: WO2018/138361
PCT Pub. Date: Aug. 2, 2018

(65) Prior Publication Data
US 2020/0008449 A1    Jan. 9, 2020

(30) Foreign Application Priority Data

Jan. 27, 2017  (DE) .......................... 202017100453.8

(51) Int. Cl.
*A23L 3/00* (2006.01)
*A23L 3/18* (2006.01)
(Continued)

(52) U.S. Cl.
CPC ............. *A23L 3/001* (2013.01); *A23L 3/185* (2013.01); *A23L 3/32* (2013.01); *H05B 6/54* (2013.01); *H05B 6/60* (2013.01)

(58) Field of Classification Search
CPC . A23L 3/00; A23L 3/001; A23L 3/005; A23L 3/185; A23L 3/26; A23L 3/28;
(Continued)

(56) References Cited

U.S. PATENT DOCUMENTS 3,532,848 A * 10/1970 Loring, Jr. ............... H05B 6/54
219/778
4,910,371 A * 3/1990 Brun ........................ H05B 6/62
219/771
(Continued)

FOREIGN PATENT DOCUMENTS

EP    2941968 A1   11/2015
WO   200201971 A1  9/2000

OTHER PUBLICATIONS

Berghofer, Emmerich et al., "Lebensmittelverarbeitung, Teil 4, Neue Verfahren und Techniken bei der Lebensmittelherstellung und Lebensmittelversorgung (Auszug)", Bundesministerium für Gesundheit, 78-84, May 2016.
(Continued)

*Primary Examiner* — Hung D Nguyen
(74) *Attorney, Agent, or Firm* — Greer, Burns & Crain, Ltd.; Steven P. Fallon

(57) ABSTRACT

The invention relates to a method and a device for continuously processing foodstuffs with pulsed electric fields, comprising a conveyor belt that is guided in a housing. The conveyor belt guide encompasses the longitudinal edges of the conveyor belt respectively in a recess that is arranged e.g. within the side walls of the housing and is preferably formed by the housing floor and the lateral insulator panels mounted at a distance from the housing floor on the inner
(Continued)

Figure 1:
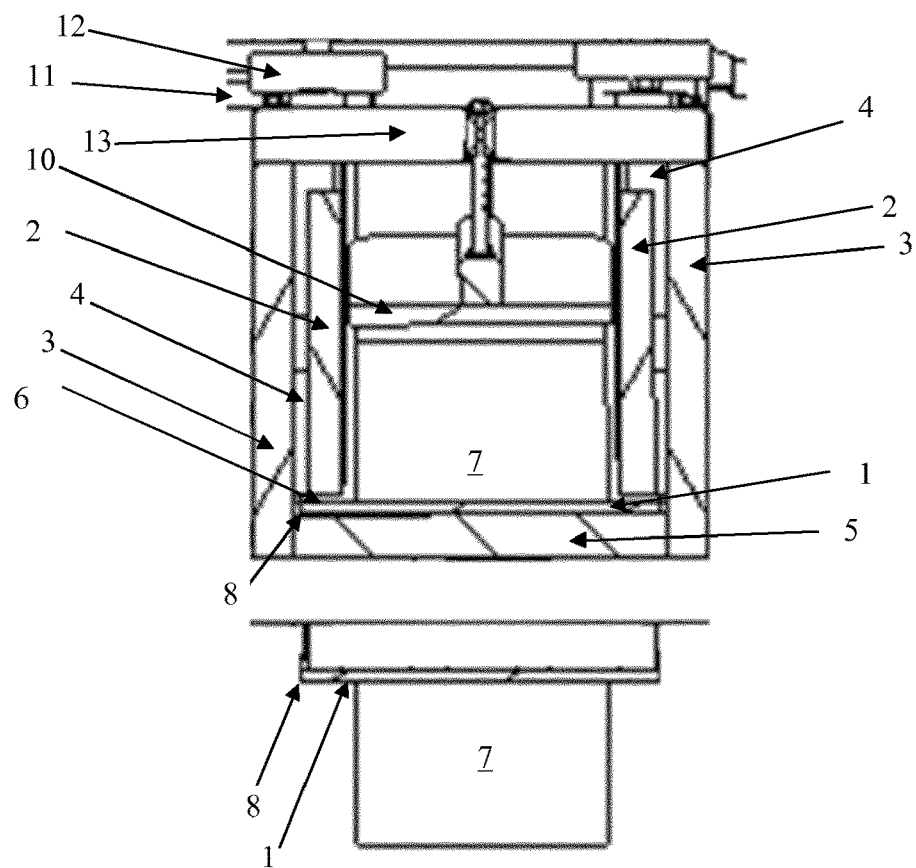

side of the side walls or are formed as a groove within the lateral insulator panels. The upper strand of the conveyor belt is guided through the guides above the housing floor within the housing.

22 Claims, 4 Drawing Sheets

(51) Int. Cl.
    *A23L 3/32*     (2006.01)
    *H05B 6/54*     (2006.01)
    *H05B 6/60*     (2006.01)

(58) Field of Classification Search
    CPC ..... A23L 3/30; A23L 3/32; A23L 3/40; A23L 3/42; A23L 5/11; A23L 5/15; A23L 5/30; A23L 5/32; H05B 6/54; H05B 6/60; H05B 6/62; H05B 6/782
    See application file for complete search history.

(56) References Cited

U.S. PATENT DOCUMENTS

| | | | |
|---|---|---|---|
| 5,326,530 A | 7/1994 | Bridges | |
| 5,476,634 A * | 12/1995 | Bridges | A61L 2/04 422/26 |
| 6,497,839 B1 * | 12/2002 | Hasegawa | A23B 9/06 422/186.03 |
| 6,537,600 B1 * | 3/2003 | Meldrum | A23L 3/42 426/15 |
| 2004/0166019 A1 | 8/2004 | Schultheiss | |
| 2006/0024195 A1 * | 2/2006 | Lagunas-Solar | A61L 2/087 422/21 |
| 2006/0106210 A1 | 5/2006 | Frenzel et al. | |
| 2006/0188992 A1 | 8/2006 | Hagio et al. | |
| 2009/0246073 A1 * | 10/2009 | Murphy | A23L 3/32 422/20 |
| 2014/0287112 A1 * | 9/2014 | Hukelmann | H05B 6/62 219/771 |
| 2018/0368451 A1 * | 12/2018 | Bhaskar | A23L 19/105 |

OTHER PUBLICATIONS

Oenhausen, Claudia, International Search Report for Application No. PCT/EP2018/052170, dated Apr. 3, 2018.

* cited by examiner

METHOD AND DEVICE FOR CONTINUOUS PROCESSING WITH A PULSED ELECTRIC FIELD

The present invention relates to a device with a conveyor belt that is guided through a housing in which electrodes for the generation of pulsed electric fields are arranged, which are arranged around the conveyor belt at a distance from one another. The device is suitable in particular for a method for the processing of foodstuffs, in particular raw vegetable foodstuffs, with pulsed electric fields, in which method the device is used. The electrodes are connected to opposite poles of a power supply.

The housing and the conveyor belt guided on the same are preferably arranged in a watertight container, which can be open above a filling level for water and which preferably comprises a swivelable cover. At its respective redirection points, the conveyor belt preferably has sections that are arranged above the filling level for water or ascend to a level above the filling level for water in order to form transfer points above the filling level. Alternatively, the housing can itself be watertight from its housing floor at least to a height at which foodstuffs can be moved on the conveyor belt between the electrodes.

The conveyor belt comprises conveyor profiles which extend between the longitudinal edges of the conveyor belt, e.g. approximately perpendicularly to the longitudinal edges of the conveyor belt. The conveyor profiles extend above the conveyor belt, preferably approximately perpendicularly to its surface. The conveyor belt runs between two redirection pulleys. Preferably, the conveyor belt in a section runs in a container that can be filled with water below the filling level for water, the upper strand in this section running above the housing floor and the lower strand below the housing floor. Accordingly, the floor plate in this section is arranged with the sections of upper strand and lower strand running on the same below the filling level for water within the container.

The device is characterized by a structure that enables an efficient generation of pulsed electric fields between the electrodes and above the conveyor belt and thus permits an efficient method for the processing of in particular lumpy foodstuffs with pulsed electric fields. A further advantage of the device resides in its simple structure.

It is known to process raw vegetable material, in particular potatoes, with pulsed electric fields that can be generated between two spaced-apart electrodes, between which the parts of plants are arranged, e.g. in water.

The object of the invention lies in the provision of an alternative device for the continuous processing of foodstuffs with pulsed electric fields. The device should preferably allow an energy-efficient generation of pulsed electric fields and, particularly preferably, have a simple structure.

The invention achieves the object with the features of the claims and in particular provides a device for the continuous processing of foodstuffs with pulsed electric fields, which comprises a conveyor belt that is guided in a housing. The conveyor belt guide respectively encompasses the longitudinal edges of the conveyor belt in a recess that is arranged e.g. within the side walls of the housing and preferably formed by the housing floor and lateral insulator panels mounted on the inside of the side walls at a distance from the housing floor or are formed as a groove within the lateral insulator panels. The upper strand of the conveyor belt is guided through the guides above the housing floor within the housing. The lateral insulator panels have a constant thickness and are mounted on the inside of the side walls, which can be made of e.g. stainless steel or insulating material. The invention further provides a method for processing foodstuffs, in particular raw vegetable foodstuffs, in which the foodstuffs are conveyed by the conveyor belt between the electrodes and voltage pulses are applied to the electrodes. Therein, the container in which the electrodes are arranged is filled up to the filling level with water.

The conveyor belt comprises conveyor profiles rising above its surface, which extend up until a slight distance adjacent to the lateral insulator panels, so that not only can the foodstuffs be conveyed by the conveyor profiles even when the housing above the conveyor belt is filled with water up to a filling level, but, moreover, they cannot slip between the lateral insulator panels and the conveyor profiles or get stuck between the same. The slight distance up until which the conveyor profiles extend vis-à-vis the insulator panels can be e.g. 1 to 30 mm, preferably 2 or 5 mm to 20 mm. The side walls and lateral insulator panels can optionally be formed as one piece from an insulating material, e.g. the side walls are respectively subdivided into at least two sections along the conveyor belt or respectively extend along the entire length of one side.

A guide is preferably provided below the housing floor for the lower strand of the conveyor belt, said guide in the form of e.g. grooves encompassing the longitudinal edges of the conveyor belt at least in sections. The grooves can be formed by guide rails that are arranged at a distance from the housing floor, e.g. are mounted on the side walls. Alternatively, the guide rails can themselves comprise grooves that encompass the longitudinal edges of the conveyor belt. The guide rails can be fixed e.g. to the housing floor itself or to the side walls below the housing floor, i.e. opposite the lateral insulator panels and opposite the upper strand.

In its terminal sections, the conveyor belt is preferably guided to a height, to the same or different heights, that is above the filling level. Terminal sections of the conveyor belt that are above the filling level of the housing form transfer points for the foodstuffs to be processed, in particular a receiving point and, in the direction of movement of the conveyor belt, a discharge point for the foodstuffs.

The lateral insulator panels comprise recesses lying opposite one another, in which electrodes, which are connected to opposite poles of a power supply, are inserted in a fitting manner. By the arrangement of the electrodes on both sides of the conveyor belt, the electric field can form above the conveyor belt so that the conveyor belt itself does not form an electrical resistance.

The recesses of the lateral insulator panels preferably extend over the entire height of the lateral insulator panels so that the recesses form a vertical guide for the electrodes, into which the electrodes can be slid. The recesses of the lateral insulator panels preferably comprise an undercut, preferably two undercuts, by which an electrode is longitudinally slidably engaged and which undercut holds the electrode in the recess. The electrodes can protrude beyond the lateral insulator panels and beyond the optional cover panels so that they can be connected in a simple manner with cables to the power supply.

The electrodes preferably have a constant cross section over their length, in particular in the section at which they are arranged in the recesses of the lateral insulator panels. The electrodes can protrude beyond the surface of the lateral insulator panels e.g. by a maximum of 20 mm, preferably a maximum of 10 mm, even more preferably a maximum of 5 mm or lie behind the same. Each electrode is optionally arranged with a surface flush with the surface of the lateral insulator panel so that the electrode and the lateral insulator panel in which it is guided in the recess form a common plane that faces the opposite electrode or opposite lateral insulator panel. The opposite lateral insulator panels and the electrodes arranged in their recesses are arranged in parallel planes, between which the conveyor belt with a width corresponding to the conveyor profiles is guided.

Preferably, the electrodes are plate-shaped, flat, solid or hollow, or hollow cylinders made of metal and the recesses of the lateral insulator panels are further preferably matching proportionally cylindrical and open in the direction of the opposite electrode. The electrodes can protrude beyond the lateral insulator panels, e.g. in the direction of the opposite electrode. The electrodes can optionally be arranged with their surface flush with the surface of the lateral insulator panels or lie behind the surface of the lateral insulator panels. The recesses in the lateral insulator panels, which form an opening for the electrodes, can widen towards the surface of the lateral insulator panels, e.g. with a funnel-shaped cross section. Facing the opposite electrode, the electrodes can have e.g. a width that is not covered by the insulator panels between the laterally adjacent lateral insulator panels, which is 10 to 300 mm, e.g. up to 250 mm, up to 200 mm, up to 150 mm or up to 100 mm, up to 50 mm or up to 30 mm. The free height of the electrodes which is not covered by insulator panels or an encasing and preferably begins at the level of or a slight distance above the plane of the lower strand is at least the filling level for water or the height up until which in the area of the electrodes a cover panel can be arranged at a distance from the lower strand.

The segments of the electrodes lying outside or above the lateral insulator panels, the segments protruding in particular beyond the lateral insulator panels and/or the side walls and/or the filling level for water, are preferably enclosed by an encasing made of an insulator, e.g. a non-conductive synthetic material, wherein the encasing comprises a passage, preferably exactly one passage, for an electric line, the passage preferably encompassing the line led through it in a waterproof manner. An encasing can be assembled e.g. from panels made of an insulator mounted against one another in a watertight manner, wherein one of the panels of the encasing at least in sections can be connected to a lateral insulator panel or can be formed as a protruding section on a lateral insulator panel. Preferably, at least one encasing, preferably both encasings, encompass the section of an electrode lying outside the lateral insulator panels in a watertight manner, e.g. as the encasing fits against the electrode in a watertight manner. Herein, furthermore, the encasing can encompass the section of an electrode at a distance. The filling level for water can be the distance of the cover panel from the conveyor belt.

The lines between the power supply and the electrodes can consist of numerous parallel strands or sheet metal or can be solid and consist of one piece, e.g. have the form of a bar. The lines can optionally have an elongated cross section that is e.g. rectangular and particularly preferably with its broad side lies on the cross-sectional surface of an electrode. A solid conductor with an elongated cross section, e.g. a busbar, can be pressed against the terminal cross-sectional surface of the electrode by a clamp that is fixed on the lateral insulator panel, in whose recess the electrode is arranged.

Preferably, every electrode is connected by means of a separate electric line, which is a coaxial cable, to the power supply, wherein the shield of the coaxial cable is further preferably grounded on the electrical housing of the power supply and the central conductor constitutes the live conductor for the first electrode respectively the neutral conductor for the other electrode. Herein, the shield of every coaxial cable can end inside the encasing, which respectively surrounds the section of an electrode lying outside the lateral insulator panels. As lines, coaxial cables, in particular when their shield is grounded on the electrical housing in which the power supply is arranged, have been shown to lead to a significantly lower inductivity than conventional, unshielded lines or than solid conductors.

The power supply is generally a pulse generator, which generates e.g. pulses of a duration of 1 to 25 µs at a voltage of 5 to 40 kV and a pulse power of 10 to 500 J. The power supply is preferably arranged in an electrical housing, which is mounted directly on a container that can be filled with water, in which the conveyor belt is arranged. This way, the lines, which are preferably each a separate coaxial cable for each electrode, can have a short length and generate correspondingly low power losses. The length of each line is preferably a maximum of 200 or a maximum of 150 cm, more preferably a maximum of 100 cm, even more preferably a maximum of 40 to 80 cm.

By guiding the conveyor belt along its longitudinal edges and arranging the electrodes in lateral insulator panels, the electrodes are arranged at a minimum distance from each other for the width of the conveyor belt and its conveyor profiles. This way, the pulsed electric fields can be generated with a low electric energy output, i.e. the applied electric energy generates pulsed electric fields effectively over the width of the conveyor belt.

The device preferably comprises at least one cover panel, optionally two or more cover panels made of an insulating material, which are arranged between the side walls and/or can lie on the upper edges of the lateral insulator panels. Such cover panels optionally comprise openings that have at least the cross section of the electrodes and through which the electrodes are arranged. The at least one cover panel preferably is reversibly adjustable or fixable at a distance from the conveyor belt in order to limit a conveyance cross section that is formed between the conveyor belt and the cover panel and the lateral insulator panels and/or the electrodes. The cover panel is preferably arranged at least in the area of the electrodes approximately at the distance from the conveyor belt at which the conveyor profiles rise above the conveyor belt. The reversible fixation and/or adjustment of the at least one cover panel at a distance from the conveyor belt preferably occurs at a position at which the surface of the cover panel facing the conveyor belt lies below the filling level of water in the area of the electrodes in order to convey foodstuffs to be processed under the filling level, i.e. completely surrounded by water, in a fixed conveyance cross section between the electrodes. The cover panels can be fixable e.g. on supports that extend on or above the lateral insulator panels between the side walls.

The side walls are preferably arranged vertically and the guide for the conveyor belt and/or the housing floor is horizontal in the section in which the electrodes are arranged.

The housing floor is optionally connected via a tongue and groove connection to the side walls, which e.g. are loaded against one another. This way, by replacing the housing floor and the conveyor belt as well as the profiles of the latter with a respectively narrower or wider configuration, the device can be adjusted, e.g. to a different field strength with the same electric energy or to a different cross section, if applicable with a corresponding increase or decrease in the electric energy introduced.

The housing floor can be composed of an insulating material; the side walls are made of stainless steel, preferably of an insulating material, e.g. synthetic material.

The power supply is preferably set to charge the electrodes respectively with electric pulses of opposite polarity with the same magnitude of voltage, e.g. one electrode with voltage pulses of +15 kV and the other electrode with −15 kV. In this embodiment, none of the electrodes is connected to ground, but rather the electrodes are connected in the circuit in a bipolar fashion toward the electrical neutral point, for instance in a symmetrical fashion one of the electrodes at +15 kV and the other one of the electrodes at −15 kV. This way, the voltage pulses at the electrodes are symmetrically poled toward ground, e.g. +15 kV/−15 kV. This has the advantage that the container and the water contained in the container in the method, which is in electrical contact with the electrodes, can be grounded and do not themselves conduct voltage pulses.

The invention will now be explained in greater detail by means of schematic figures showing a central section of an embodiment of the device, to the respective ends of which sections are connected in which the housing floor with the guides for the conveyor belt ascends and in which the conveyor belt is deflected. In the figures, identical reference numbers designate elements with identical functions.

Figure 2:
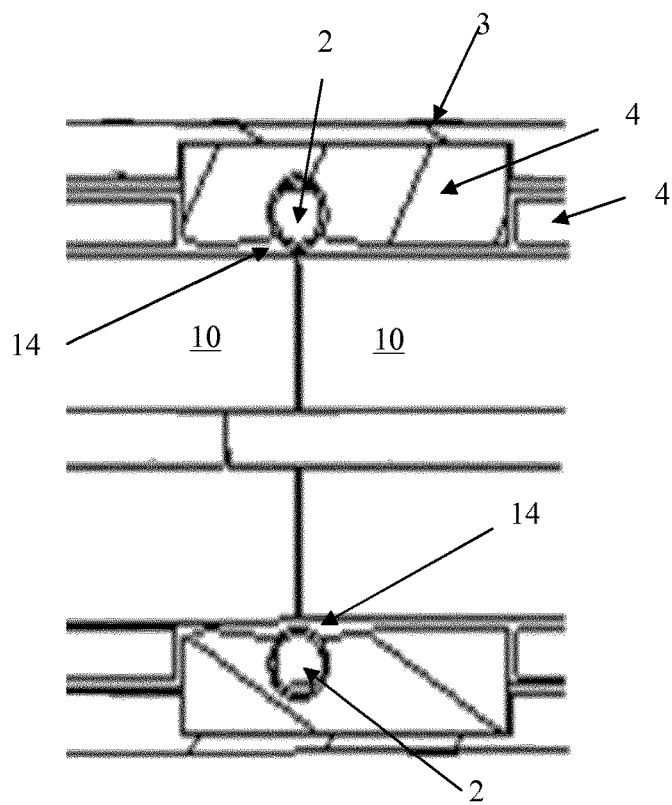
Figure 3:
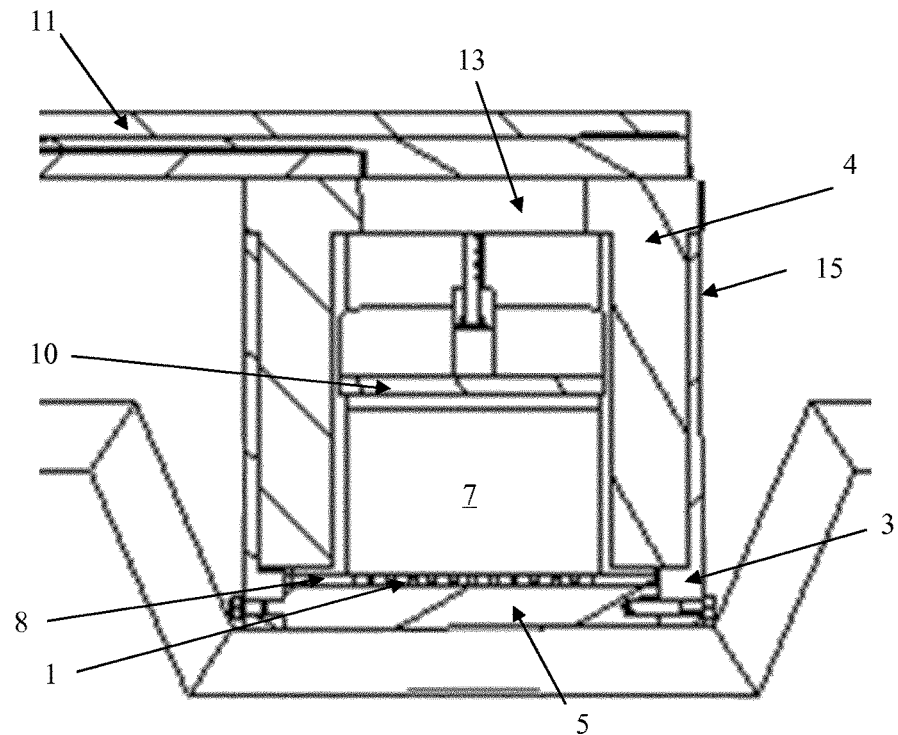
Figure 4:
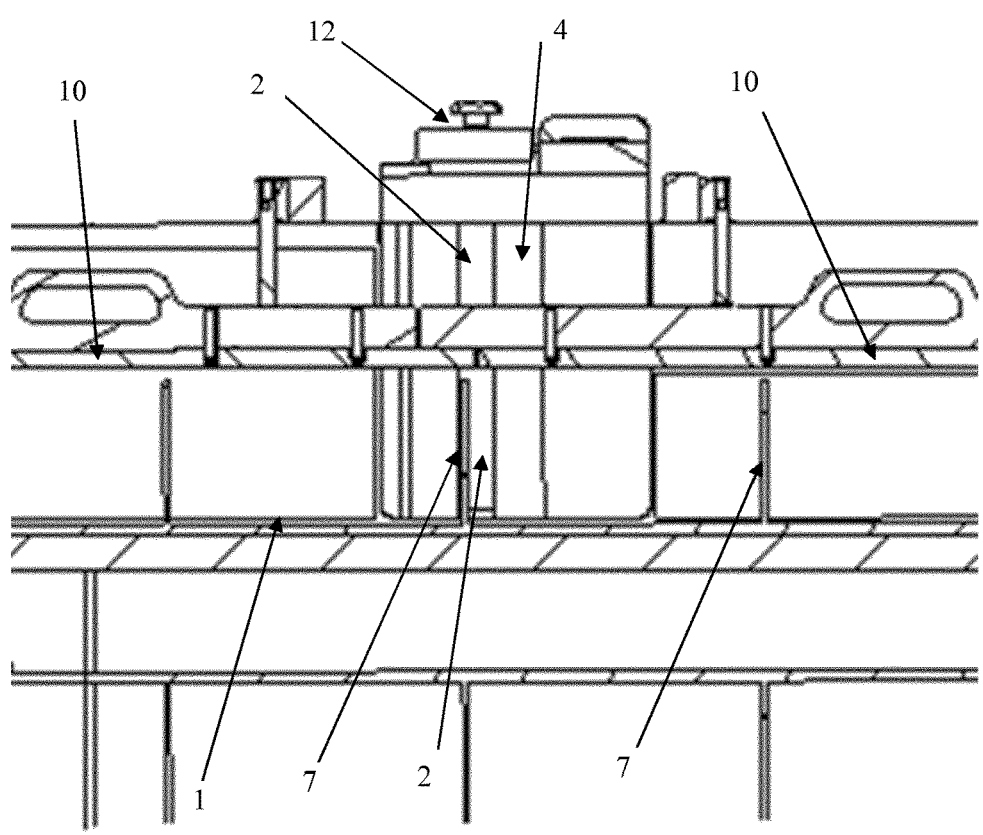
Figure 5:
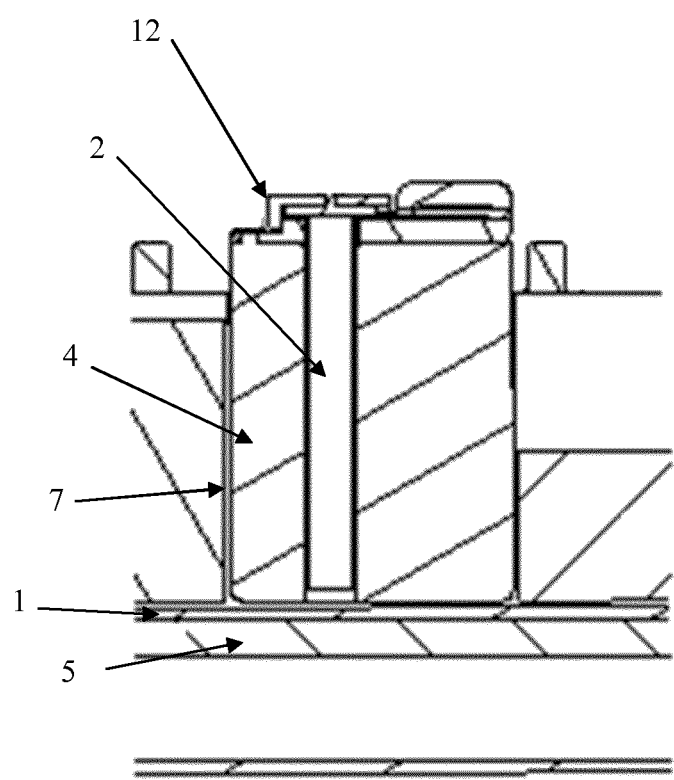
Figure 6:
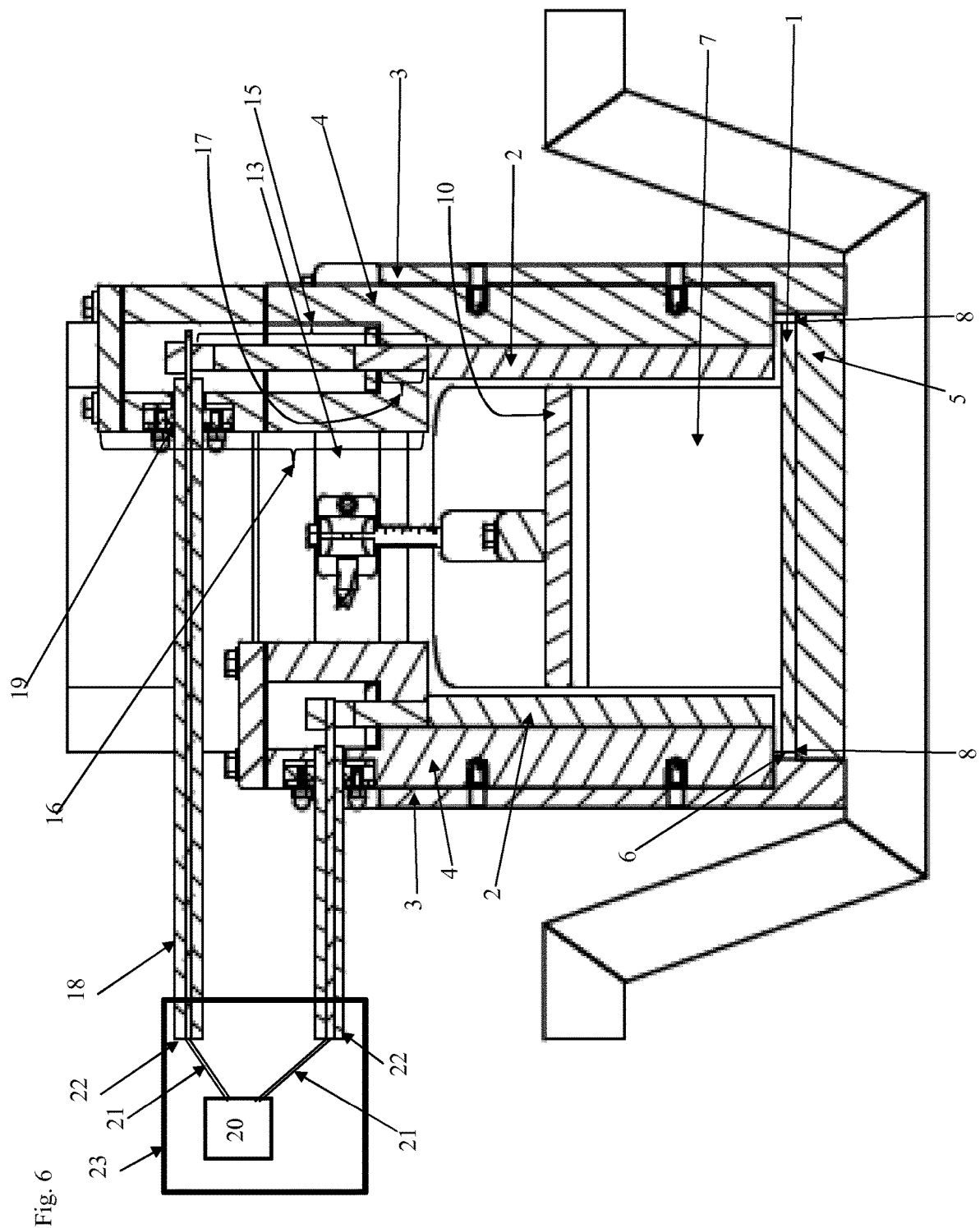

FIG. 1 shows a cross section through the housing perpendicular to the running direction of the conveyor belt, FIG. 2 shows a section of a cross section parallel to the surface of the upper strand of the conveyor belt, FIG. 3 shows a section of a cross section perpendicular to the running direction of the conveyor belt, FIG. 4 shows a vertical cross section through the housing parallel to the running direction of the conveyor belt, FIG. 5 shows a section of a cross section through an insulator panel with an electrode arranged therein, parallel to the surface of the insulator panel, and FIG. 6 shows a cross section through a device perpendicular to the running direction of the conveyor belt.

FIG. 1 shows a section transverse to the running direction of the conveyor belt 1 through the device in accordance with the invention in a plane in which the electrodes 2 are sectioned. The housing comprises side walls 3 on the respective inner sides of which the lateral insulator panels 4 are arranged. The lateral insulator panels 4 are parallel to each other and limit the conveyance channel of the housing laterally, which is limited by the housing floor 5 downward. The conveyance channel is limited opposite the conveyor belt 1 by a cover panel 10 at least in the area of the electrodes 8, the cover panel 10 extending between the lateral insulator panels 4, i.e. between the electrodes 2. The cover panel 10 is generally preferably arranged at a distance from the conveyor belt 1 that slightly exceeds the height of the conveyor profiles 7, e.g. is greater by a maximum of 2 cm, preferably a maximum of 1 cm than the height of the conveyor profiles 7. The cover panel 10 is generally preferably parallel to the conveyor belt 1 at least in a section of the conveyor belt 1 that is arranged horizontally. The cover panel 10 is adjustable in its height and releasably fixed on supports 13, which extend between the side walls 3. The cover panel 10 can comprise handles by means of which the cover panel 10 after being released can be removed from the supports 13.

The housing floor 5 is optionally connected to the side walls 3 in a watertight manner; the lateral insulator panels 4 can also be mounted on the side walls 3 in a non-watertight manner. Preferably, the lateral insulator panels 4 are mounted on the side walls 3 in a watertight manner, and are optionally integrally formed with the side walls 3. The housing with side walls and housing floor 3 can generally be arranged in a watertight container, and therein the housing floor 3 can have openings.

The conveyor belt 1 runs in parallel to the housing floor 5, which is generally preferably flat at least in the section in which the electrodes 2 are arranged. The conveyor belt 1 comprises conveyor profiles 7 protruding vertically, which extend e.g. perpendicularly to the longitudinal edges 8 of the conveyor belt 1, preferably also perpendicularly to the surface of the conveyor belt 1. The conveyor profiles 7 are arranged at a slight distance from the lateral insulator panels 7 so that they can be moved past the latter. The longitudinal edges 8 of the upper strand of the conveyor belt 1 are guided in grooves as guides 6, which are formed by the distance of the housing floor 5 from the lateral insulator panels 4. The lower strand of the conveyor belt 1 is guided in guides on the underside of the housing floor 5.

The electrodes 2 protrude beyond the cover panel 10 so that an electrical connection through a busbar 11 can be mounted on the electrodes 2 above the cover panel 10.

A busbar 11 lies on top of the terminal cross-sectional surface of an electrode 2 and is pressed against this cross-sectional surface by means of a clamp 12.

FIG. 2 in a sectional view shows the lateral insulator panels 4 in which the electrodes 2 are arranged in recesses. The electrodes 2 are cylindrical and sections of their cross section lie in undercuts of the recesses in the lateral insulator panels 4, wherein the recesses comprise openings 14 to the surface of the lateral insulator panel 4, which free the surface of the electrodes 2, i.e. let the electrode 2 directly adjoin the conveyance cross section above the conveyor belt 1. The electrodes are arranged with their surface flush with the plane of the lateral insulator panels, wherein the recesses in the lateral insulator panels that form an opening 14 for the electrodes widen with a funnel-shaped cross section toward the surface of the lateral insulator panels. The electrodes 2 shown here have a hollow-cylindrical cross section. Here, the cover panel 10 is divided.

FIG. 3 depicts, in sections, a sectional view lying in a section of the conveyor belt 1 next to the electrodes 2, and shows that the conveyance cross section is limited by the conveyor belt 1 running on the housing floor 5, the lateral insulator panels 4 and the cover panel 10. The conveyor profiles 7 preferably have dimensions that cover this conveyance cross section with a small spacing, e.g. from 0.5 to 2 cm. The guide 6 for the longitudinal edges 8 of the conveyor belt 1 is a groove that is formed by the distance between the lateral insulator panel 4 and the housing floor 5.

The side walls 3 are connected to the housing floor 5 in a watertight manner in the embodiment shown here.

FIG. 4 shows a sectional view of the housing along the direction of conveyance of the conveyor belt 1 perpendicular to its surface. As generally preferred, the figures show that at least in a section along the electrodes 2 the conveyor belt 1 is arranged in a plane and the cover panel 10 is arranged at a distance in a parallel plane and the lateral insulator panels 4 are arranged parallel to each other and perpendicular to the plane of the conveyor belt 1 and of the cover panel 10 in order to delimit a rectangular conveyance cross section between them. The lateral insulator panels 4 and the electrodes 2 in their recesses can protrude beyond the conveyance cross section, i.e. the cover panel 10.

The guide for the lower strand of the conveyor belt 1 is arranged below the housing floor 5.

FIG. 5 in a sectional view parallel to the surface of a lateral insulator panel 4 shows a clamp 12 that is screwed tightly to the insulator panel and pressing the busbar 11 against the cross-sectional surface of the electrode 2 in order to establish an electrical contact.

FIG. 6 shows a cross section through a device in accordance with the invention through the electrodes 2 perpendicular to the running direction of the conveyor belt 1. The electrodes 2 are arranged in recesses of the lateral insulator panels 4. Opposite the electrodes 2, the side wall 3 lies against the lateral insulator panels 4, which can be fixed to each other e.g. with screws as shown.

In a section 15 that protrudes beyond the filling level, the electrodes 2 can be of one piece or be composed of several sections. The section 15 of the electrodes 2 that protrudes beyond the filling level is sealingly encompassed by an encasing 16 according to the preferred embodiment. The encasing 16 here forms a sealing area 17 at the area of the electrode 2 at which the section 15 of the electrode 2 that protrudes above the filling level begins. In the remaining area, the encasing 16 can be arranged at a distance from the section 15 of the electrode 2, as depicted.

Each electrode 2 is electrically connected to a power supply through a separate coaxial cable 18, wherein the shield 22 of the coaxial cable 18 is grounded in the power supply 20, i.e. on the electric housing that surrounds the power supply, while the central conductor 21 of the coaxial cable 18 is connected to the electrode 2. The encasing 16 comprises a watertight passage 19, e.g. in the form of a clamping seal, so that the encasing 16 surrounds in a waterproof manner the section 15 of the electrode 2 that protrudes above the filling level. The power supply 20 is arranged in an electrical housing 23 on which the shield 22 of each of the separate coaxial cables 18 is grounded, while the central conductors 21 of the coaxial cables 18 are respectively electrically connected to the power supply 20.

| List of reference numbers: | |
|---|---|
| 1 | conveyor belt |
| 2 | electrode |
| 3 | side wall |
| 4 | lateral insulator panel |
| 5 | housing floor |
| 6 | guide |
| 7 | conveyor profile |
| 8 | longitudinal edge of conveyor belt |
| 10 | cover panel |
| 11 | busbar |
| 12 | clamp |
| 13 | support |
| 14 | opening of recess |
| 15 | section of electrode protruding above the filling level |
| 16 | encasing |
| 17 | sealing area |
| 18 | coaxial cable |
| 19 | passage |
| 20 | power supply |
| 21 | central conductor |
| 22 | shield |
| 23 | electrical housing |

The invention claimed is:

1. A device for continuous by processing of foodstuffs with pulsed electric fields, comprising a housing with a housing floor that extends between the side walls of the housing, a rotating conveyor belt guided through the housing with conveyor profiles arranged transversely to the direction of conveyance, and two electrodes arranged in the housing and at a distance from each other, which are connected to the connections of opposite polarity of a power source, characterized in that lateral insulator panels are arranged on both sides of the conveyor belt on the inner side of the side walls, wherein the conveyor profiles extend up to a slight distance away from the lateral insulator panels and the electrodes are arranged in matching recesses of the lateral insulator panels, which are open toward the opposite electrode, wherein the electrodes protrude beyond or lie behind the surfaces of the lateral insulator panels by a maximum of 20 mm.

2. The device according to claim 1, wherein the electrodes are hollow-cylindrical and extend perpendicularly to the plane of the conveyor belt.

3. The device according to claim 1, wherein the electrodes extend vertically.

4. The device according to claim 1, wherein the electrodes are arranged with a surface flush with the lateral insulator panels.

5. The device according to claim 1, wherein the guides for the longitudinal edges of the conveyor belt (1) run horizontally in the section in which the electrodes are arranged in recesses of the lateral insulator panels.

6. The device according to claim 1, wherein the guides for the longitudinal edges of the conveyor belt run parallel to the housing floor.

7. The device according to claim 1, wherein the housing floor is formed of an insulating material.

8. The device according to claim 1, wherein the side walls are formed of an insulating material.

9. The device according to claim 1, wherein the side walls and the lateral insulator panels are connected to each other in a watertight fashion or are configured as one piece.

10. The device according to claim 1, wherein the slight distance between the conveyor profiles and the lateral insulator panels is 1 to 10 mm.

11. The device according to claim 1, wherein the electrodes extend perpendicularly to the guides for the longitudinal edges of the conveyor belt at least from the plane of the conveyor belt over the complete height of the respective lateral insulator panel.

12. The device according to claim 1, wherein the recesses of the lateral insulator panels match to the cross section of the electrodes and have at least one undercut and the electrodes are held in the recess in a longitudinally slidable.

13. The device according to claim 1, wherein at least one cover panel arranged parallel to the conveyor belt covers the conveyance cross section between the lateral insulator panels.

14. The device according to claim 13, wherein the at least one cover panel is arranged between the side walls and/or lies on the upper edges of the insulator panels.

15. The device according to claim 1, wherein the electrodes have a constant cross section, protrude beyond the housing and, at their end opposite the conveyor belt, are connected to electrical lines that are connected to the connections of the power supply.

16. The device according to claim 15, wherein the electrical lines are solid busbars, which are arranged against the cross-sectional surface of the electrodes.

17. The device according to claim 1, wherein the lower strand of the conveyor belt beneath the housing floor is guided at its longitudinal edges at least in sections in recesses formed by the housing floor and guide rails spaced therefrom a or within these guide rails.

18. The device according to claim 1, wherein the longitudinal edges of the upper strand of the conveyor belt are guided in a guide formed on the lateral insulator panels.

19. The device according to claim 18, wherein the guide is a recess between the lateral insulator panels and the housing floor or is a groove formed within each lateral insulator panel.

20. The device according to claim 1, wherein the electrodes comprise sections that protrude above the filling level for water, and these sections are respectively encompassed by an encasing in a waterproof manner.

21. The device according to claim 1, wherein the electrodes are respectively connected to a power source by means of a separate line, which is a coaxial cable, wherein the shield of each coaxial cable is grounded on an electrical housing in which the power source is arranged and each electrode is respectively only connected to the central conductor of the separate coaxial cable.

22. The device according to claim 1, wherein the power source is set to apply the voltage pulses to the electrodes with voltage pulses of opposite polarity and the same magnitude, in particular +15 kV/−15 kV.

* * * * *